United States Patent
Liu et al.

(10) Patent No.: US 9,653,101 B1
(45) Date of Patent: May 16, 2017

(54) PERPENDICULAR MAGNETIC RECORDING (PMR) WRITE HEAD WITH HYBRID SIDE SHIELD

(71) Applicant: Headway Technologies, Inc., Milpitas, CA (US)

(72) Inventors: Ying Liu, San Jose, CA (US); Yiming Wang, San Jose, CA (US); Yuhui Tang, Milpitas, CA (US); Yue Liu, Fremont, CA (US); Sanghyun Lim, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/283,467

(22) Filed: Oct. 3, 2016

(51) Int. Cl.
G11B 5/31 (2006.01)
G11B 5/127 (2006.01)
G11B 5/11 (2006.01)

(52) U.S. Cl.
CPC ............ *G11B 5/3116* (2013.01); *G11B 5/112* (2013.01); *G11B 5/1278* (2013.01); *G11B 5/315* (2013.01); *G11B 5/3169* (2013.01)

(58) Field of Classification Search
CPC ......... G11B 5/3116; G11B 5/31; G11B 5/112; G11B 5/1278; G11B 5/315; G11B 5/3169
USPC .................. 360/125.11–125.14, 125.1–125.5
See application file for complete search history.

(56) References Cited

U.S. PATENT DOCUMENTS

| 8,238,059 | B1 | 8/2012 | Tang et al. | |
|---|---|---|---|---|
| 8,284,516 | B1 | 10/2012 | Tang et al. | |
| 8,498,079 | B1 | 7/2013 | Song et al. | |
| 8,582,238 | B1 | 11/2013 | Liu et al. | |
| 8,699,183 | B2* | 4/2014 | Sahoo | G11B 5/1278 360/125.03 |
| 8,879,208 | B1 | 11/2014 | Liu et al. | |
| 8,929,027 | B1* | 1/2015 | Sugiyama | G11B 5/3116 360/125.01 |
| 9,214,165 | B1 | 12/2015 | Liu et al. | |
| 9,280,992 | B1* | 3/2016 | Jiang | G11B 5/39 |
| 9,299,367 | B1 | 3/2016 | Tang et al. | |
| 9,361,912 | B1 | 6/2016 | Liu et al. | |
| 9,466,319 | B1* | 10/2016 | Tang | G11B 5/1278 |

(Continued)

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

*Primary Examiner* — Allen T Cao
(74) *Attorney, Agent, or Firm* — Saile Ackerman LLC; Stephen B. Ackerman (57) ABSTRACT

A perpendicular magnetic recording (PMR) writer is disclosed wherein a hybrid side shield (hSS) has an inner 15-24 kG hot seed layer formed between a gap layer and an outer hSS layer to improve tracks per inch capability while maintaining acceptable adjacent track interference (ATI). The outer hSS layer has a magnetization saturation (Ms) value from 10-19 kG and less than that of the inner hot seed layer. The inner hot seed layer has a far side that is 100 to 500 nm from a center of the main pole and may be coplanar with the sidewalls of an overlying write gap and 19-24 kG trailing shield layer. As a result, the side shield return field is substantially improved over a full side shield made of 12-16 kG material. Meanwhile, the trailing shield return field is substantially the same to enable better area density capability (ADC).

28 Claims, 10 Drawing Sheets

(56) References Cited

U.S. PATENT DOCUMENTS

| | | | |
|---|---|---|---|
| 9,508,364 B1* | 11/2016 | Tang | ........................ G11B 5/112 |
| 2009/0103211 A1* | 4/2009 | Chen | ..................... G11B 5/3116 |
| | | | 360/125.03 |

* cited by examiner

PERPENDICULAR MAGNETIC RECORDING (PMR) WRITE HEAD WITH HYBRID SIDE SHIELD

RELATED PATENT APPLICATIONS

This application is related to the following: U.S. Pat. No. 9,361,912; and U.S. Pat. No. 9,299,367, assigned to a common assignee and herein incorporated by reference in their entirety.

TECHNICAL FIELD

The present disclosure relates to a shield structure in a PMR write head wherein a side shield is comprised of a first magnetic layer adjoining the side gap and disposed below the write gap, and a second magnetic layer with a lower magnetization saturation (Ms) than the first magnetic layer that adjoins a side of the first magnetic layer opposite the side gap in order to improve tracks per inch (TPI) capability while maintaining acceptable adjacent track interference (ATI).

BACKGROUND

A PMR write head typically has a main pole with a small surface area at an air bearing surface (ABS), and coils that conduct a current and generate a magnetic flux in the main pole such that the magnetic flux exits through a write pole tip and enters a magnetic medium (disk) adjacent to the ABS. Magnetic flux is used to write a selected number of bits in the magnetic medium and typically returns to the main pole through a trailing loop pathway. The trailing loop generally has a trailing shield structure that arches over the write coils and connects to a top surface of the main pole layer above a back gap magnetic connection. The first trailing shield that adjoins a top surface of the write gap may have a high moment (19-24 kG) layer called a hot seed layer. A good hot seed response is required to reduce stray fields in the side shields, and in a leading shield when present. A PMR head which combines the features of a single pole writer and a double layered medium (magnetic disk) has a great advantage over longitudinal magnetic recording (LMR) in providing higher write field, better read back signal, and potentially much higher areal density.

Shingled magnetic recording (SMR) is a form of PMR and has been proposed for future high density magnetic recording by R. Wood et al. in "The Feasibility of Magnetic Recording at 10 Terabits Per Square Inch on Conventional Media", IEEE Trans. Magn., Vol. 45, pp. 917-923 (2009). In this scheme, tracks are written in a sequential manner from an inner diameter (ID) to an outer diameter (OD), from OD to ID, or from OD and ID towards a middle diameter (MD) in a radial region of a disk in a hard disk drive (HDD). In other words, a first track is partially overwritten on one side when a second track adjacent to the first track is written, and subsequently a third track is written that partially overwrites the second track, and so forth. Track widths are defined by the squeeze position or amount of overwrite on the next track rather than by write pole width as in today's hard disk drives.

One of the main advantages of shingled writing is that write pole width no longer needs to scale with the written track width. Thus, the opportunity for improved writability and higher device yield is not restricted by pole width as a critical dimension to be tightly controlled. Secondly, adjacent track erasure (ATE) or ATI becomes less of an issue because tracks are written sequentially in a cross-track dimension and only experience a one time squeeze from the next track.

For both conventional magnetic recording (CMR) and shingle magnetic recording (SMR), continuous improvement in storage area density is required for a PMR writer. A write head that can deliver or pack higher bits per inch (BPI) and higher TPI is essential to the area density improvement. The main pole and hot seed layer in the first trailing shield are usually comprised of high moment (19-24 kG) material while the side shields, and remainder of the trailing shield structure are made of low moment (10-19 kG) materials. If writeability can be sustained, the main pole size must shrink, and a thinner write gap at the main pole trailing (top) surface and a narrower side gap adjoining the main pole sides in the cross-track direction are preferred for better track field gradient (Hy_grad, BPI) and cross-track field gradient (Hy_grad_x, TPI), respectively. Although a side shield made entirely of low moment (low Ms) material exhibits low far side ATI, severe side shield tip saturation degrades TPI and is a major obstacle to further decreasing the side gap (SG) dimension for area density control (ADC) improvement.

Therefore, a new shield design is needed to minimize side shield tip saturation and maintain low ATI on the far side in order to enable higher TPI and a smaller side gap for TPI capability to at least 500K/in for CMR and at least 700K/in for SMR. A new design must take into account that the geometries and dimensions of the side shield are key to both overwrite (OW) and bit error rate (dBER) performance in hard disk drives (HDD).

SUMMARY

One objective of the present disclosure is to provide a shield structure for a PMR writer that minimizes side shield tip saturation to enable higher TPI while maintaining low ATI in a far side portion of the side shield.

Another objective of the present disclosure is to provide a method of making the shield structure of the first objective with conventional materials and processes.

In one embodiment of the present disclosure, these objectives are realized by configuring a shield structure for a PMR writer wherein a side shield on each side of a main pole is comprised of two layers in a hybrid side shield (hSS) design. A side shield tip or inner layer that adjoins the side gap and is positioned below the write gap is made of a 15-24 kG hot seed material in order to enhance TPI while an outer hSS layer that is not covered by the write gap is comprised of a 10-19 kG magnetic material to maintain low ATI. It is important that the inner hot seed layer has a higher kG (Ms) value than the outer hSS layer. Each inner hot seed layer has a first side adjoining a side gap and a second side opposite the first side where the second side is aligned at an angle from 30 to 90 degrees with respect to a first plane that includes the write pole trailing edge at the ABS. The hSS has a thickness (t) in a down-track direction and a width in a cross-track direction. The intersection of the second side of each inner hot seed layer with the first plane is about 100 to 500 nm from the center of the write pole trailing edge.

From a top-down view, each inner hot seed layer has a first height (h1) in a direction orthogonal to the ABS, and each outer hSS layer has a height that increases from h1 at the inner hot seed layer second side to a second height (h2) at a far side of the side shield. In one aspect, the first side of the inner hot seed layer is formed substantially parallel to the nearest side of the write pole and extends to height h1. A third (back) side of the inner hot seed layer is aligned substantially parallel to the ABS and extends from an end of the first side to an end of the second side that is at height h1 from the ABS.

Each side gap is non-conformal in that there is a smaller cross-track width in a first side gap section which separates the inner hot seed layer and write pole than in a second side gap section that separates the outer hSS layer and write pole between the first height and second height. A 10-19 kG leading shield may be formed with a top surface along a second plane that includes a bottom side of the side shields and bottom side of the leading gap at the ABS.

The trailing shield is a composite structure having a 19-24 kG (hot seed) layer formed on the write gap and with a cross-track width (w1) essentially equal to that of the write gap, and a 10-19 kG magnetic layer formed on a top surface of the hot seed layer and along the outer sidewall of the write gap. The 10-19 kG TS layer contacts the top surfaces of the outer hSS 10-19 kG layers along the first plane to form an all wrap around (AWA) shield structure that also includes the leading shield. In other embodiments, the 10-19 kG TS layer has a top surface coplanar with that of the hot seed layer, and there is a third TS layer with a Ms value greater than that of the 10-19 kG TS layer that is formed on the hot seed layer and 10-19 kG TS layer.

From a down-track cross-sectional view, leading and trailing sides of the main pole proximate to the ABS may be tapered with respect to a center plane that bisects the main pole and is formed orthogonal to the ABS. As a result, the write gap may be tapered with respect to the center plane and a backside thereof is a greater down-track distance from the center plane than the front side of the write gap at the ABS. Also, the TS hot seed layer has a first side facing the main pole that may be aligned substantially parallel to the tapered main pole trailing side.

A method for forming the shield structure of the present disclosure is provided. A 15-24 kG side shield layer is deposited on a leading shield layer, and then an opening is formed in the 15-24 kG layer thereby exposing a portion of the leading shield top surface. A dielectric layer is conformally deposited to form a side gap on the sidewalls of the opening and a lead gap on the exposed top surface of the leading shield. Thereafter, the main pole is deposited on the side gap and lead gap to fill the opening. After a chemical mechanical polish (CMP) process, a trailing side of the main pole is formed coplanar with a top surface of the 15-24 kG side shield layer. Next, the write gap and 19-24 kG trailing shield layer are deposited. A photoresist layer is coated on the trailing shield layer and patterned to provide an etch mask. An etch step removes unprotected regions of the 19-24 kG trailing shield and write gap to form sidewalls thereon. According to one preferred embodiment, the etch process is continued to remove portions of the 15-24 kG side shield layer that are not covered by the write gap thereby forming the inner hSS layer, and stops on the leading shield. Optionally, a moderate etch is used to stop in the 15-24 kG side shield layer before reaching the leading shield. Finally, the patterned photoresist layer is removed and a 10-19 kG magnetic layer is deposited on leading shield and 19-24 kG trailing shield to form the outer hSS layer and the 10-19 kG trailing shield structure.

DETAILED DESCRIPTION

The present disclosure relates to an all wrap around (AWA) shield structure in a PMR write head wherein a hybrid side shield (hSS) includes a 15-24 kG layer also known as a hot seed layer in a so-called tip (inner) region adjoining each side gap, and a 10-19 kG outer hSS layer on a side of the inner hot seed layer opposite the side gap to enhance TPI while maintaining low ATE. The shield structure disclosed herein is compatible with a variety of main pole designs including those with one or both of a tapered leading side and tapered trailing side. Moreover, the PMR writer may have a combined read head/write head structure. In the drawings, the y-axis is a cross-track direction, the z-axis is a down-track direction, and the x-axis is in a direction orthogonal to the ABS and towards a back end of the device. Thickness refers to a down-track dimension, "height" relates to a distance along the x-axis direction orthogonal to the ABS, and "width" relates to a cross-track distance.

Figure 1:
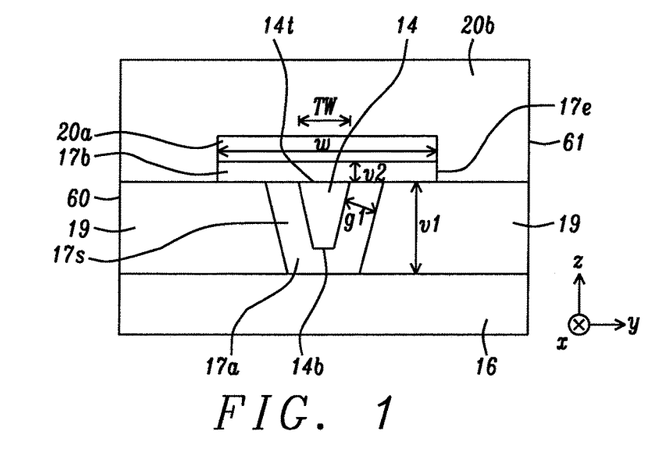
FIG. 1 is an ABS view of a process of record (POR) shield design for a PMR writer wherein the shields form an all wrap around (AWA) structure that surrounds the write pole, and the side shield is made entirely of a 10-19 kG material.

Referring to FIG. 1, an ABS view of a POR shield design previously fabricated by the inventors is shown wherein a main pole has a front portion referred to as a write pole 14 at the ABS with leading edge 14b, and a trailing edge 14t that defines a track width TW. The main pole extends to a back end of the PMR writer where a back portion (not shown) is magnetically connected to the trailing shield comprised of an upper 10-19 kG magnetic layer 20b and a 19-24 kG hot seed layer 20a where the hot seed layer has a cross-track width w preferably the same as that of the write gap 17b. The write gap has a down-track thickness v2.

Side shields 19 have down-track thickness v1 and are separated from the write pole by a side gap 17s having a cross-track width g1. Each side shield has a top surface that adjoins trailing shield layer 20b between a side 17e of the write gap and a far side 60 (or 61) of the shield structure. There is also a leading shield 16 that is separated from leading edge 14b by lead gap 17a. The leading shield (LS) adjoins a bottom surface of the side shields (SS). LS, SS, and trailing shield layer 20b form an AWA design around the write pole 14 to improve field gradients in the down-track and cross-track directions as well as improve adjacent track erasure (ATE) performance.

In related U.S. Pat. No. 9,361,912, we disclosed how a hybrid side shield with a hot seed layer adjoining each side gap, and a 10-19 kG layer disposed on a far side of the hot seed layer opposite the side gap is able to provide good writability and increased TPI capability when combined with a reduced side shield height of ≤0.15 micron in an AWA shield structure. The leading shield also has a hot seed layer that is coupled to the side shield hot seed layer. The hybrid side shield is fabricated before depositing the main pole and forming the trailing shield. A hybrid side shield was also described in related U.S. Pat. No. 9,299,367 wherein a side shield hot seed layer in a partial wrap around shield structure is fully coupled to the trailing shield hot seed layer to compensate for the absence of a leading shield and thereby improve overwrite (OW) and bit error rate (BER).

Here we describe a modification of the previously disclosed AWA design where the hot seed layer in the hybrid side shield is no longer coupled to a leading shield hot seed layer, and a self-aligned process is used to form the far side of the side shield hot seed layer following main pole and trailing shield hot seed layer deposition in order to simplify the manufacturing process. As a result, the AWA design with a hSS disclosed herein is produced in fewer steps at lower cost, and has a better down-track gradient than previously realized. Furthermore, the hybrid side shield design of the present disclosure is easier to fabricate and has improved ATI compared with the hybrid side shield in the partial wrap around structure where an inner 19-24 kG layer extends beyond the sidewall of the write gap layer.

Figure 2A:
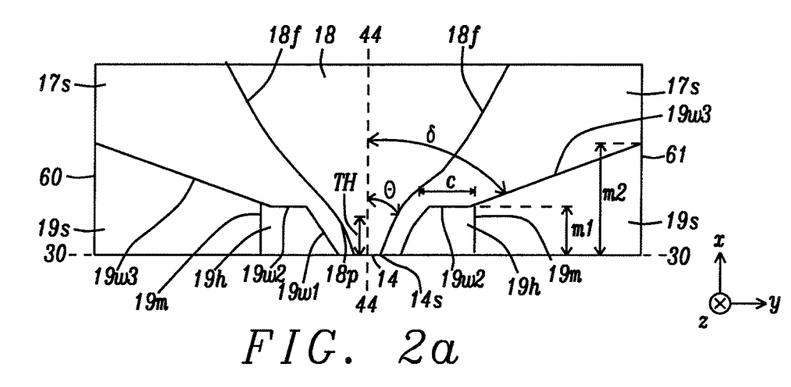
FIG. 2a is a top-down view of a hybrid side shield structure according to an embodiment of the present disclosure wherein the trailing shield and write gap are removed to show the layout of the main pole and side shields.

According to a first embodiment of the present disclosure shown in FIG. 2a from a top-down view with the trailing shield and write gap removed, the hybrid side shield structure of the present disclosure has a double tapered (dtSS) design. A first side 19w1 of each side shield is substantially parallel to write pole side 18p in a region proximate to the ABS 30-30. Also, sides 18p and 19w1 are formed at attack angle θ with respect to center plane 44-44 and the ABS. A second side 19w2 of each side shield is aligned substantially parallel to the ABS and has one end connected to an end of the first side, and an opposite end connected to a third side 19w3. The third side 19w3 is formed at angle δ with regard to the center plane where δ>θ and extends to a far side 60 (or 61) of the shield structure. Thus, a first taper is associated with side 19w1 at angle θ, and a second taper is attributed to side 19w3 at angle δ when describing the hybrid side shield shape from a top-down perspective.

The write pole tip 14 is at the ABS 30-30 and each write pole side 18p extends from the ABS to a throat height (TH) distance on either side of the center plane 44-44. The center plane is orthogonal to the ABS and bisects the main pole 18. At the TH distance, a flared main pole side 18f is connected to an end of each write pole side 18p. The flared main pole sides are separated with increasing cross-track width as the distance from the ABS becomes greater.

A key feature is that each hybrid side shield (hSS) has an inner 15-24 kG hot seed layer 19h adjoining the write gap 17s proximate to the ABS 30-30, and an outer 10-19 kG layer 19s between the hot seed layer and a far side 60 (or 61) of the side shield structure. It is important that the magnetic saturation (Ms) value of the inner hot seed layer is greater than that of the outer hSS layer. Thus, if the outer hSS layer is comprised of a 19 kG material, the inner hot seed layer has a Ms value>19 kG, and preferably in the 22-24 kG range. In other embodiments where the outer hSS layer is made of a 10-12 kG material, for example, the inner hot seed layer has a Ms value in the 15-24 kG range. Hot seed layer 19h has a front side at the ABS, a side 19w1 extending from the ABS to height m1 that is equal to or greater than TH, a back side 19w2 aligned substantially parallel to the ABS and having cross-track width c, and a fourth side 19m that faces the center plane 44-44 and adjoins a side of the outer hSS layer 19s. Backside 19w2 extends from an end of side 19w1 to an end of side 19m at height m1. Backside 19w3 of the outer hSS layer extends from the intersection of sides 19m and 19w2 to a far side of the side shield structure at height m2 where m2>m1. As a result, each outer hSS layer 19s has a first side at the ABS, a second side 19m, third side 19w3, and a fourth (far) side 60 (or 61) that is parallel to the center plane.

Hot seed layer 19h is employed to avoid side shield saturation in an inner tip region below the write gap and proximate to the write pole while the outer hSS layer of the hybrid side shield structure comprises a 10-19 kG material to maintain low ATE at far sides 60, 61. Moreover, when inner hot seed layer height m1 is decreased to a range of about 120 to 200 nm for advanced PMR writer designs, hSS saturation may be prevented while writability is maintained or enhanced.

Figure 2B:
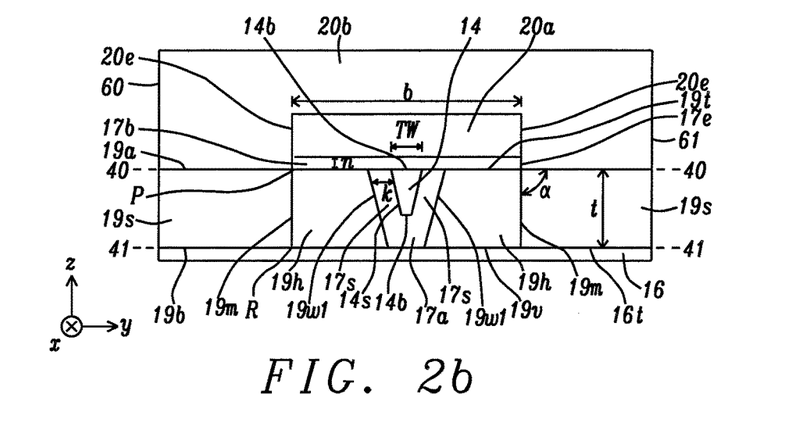
FIG. 2b is an ABS view of the hSS structure in FIG. 2a that also includes a trailing shield and leading shield to form an AWA shield structure around the main pole according to an embodiment of the present disclosure.

FIG. 2b depicts an ABS view of the hSS structure in FIG. 2a. Write pole 14 has a leading edge 14b and a trailing edge 14t at the ABS. There is a side gap 17s having cross-track width k between a side 19w1 and each side 14s of the write pole, a write gap 17b formed on the trailing edge 14t, and a lead gap 17a adjoining the leading edge 14b. Gaps 17b, 17s, 17a are comprised of one or more non-magnetic materials such as $Al_2O_3$ and silicon oxide, and completely surround the write pole. Above the write gap is a 19-24 kG hot seed trailing shield layer 20a with sides 20e that are preferably coplanar with sides 17e of the write gap, and aligned perpendicular to a first plane 40-40 that is orthogonal to the ABS. The first plane includes trailing edge 14t, top surface 19a of each outer hSS layer 19s, and top surface 19t of each inner 15-24 kG hSS layer 19h. Trailing shield layer 20a and the write gap each have a cross-track width b that is greater than a track width (TW) of the write pole. According to a preferred embodiment, side 19m in each side shield is formed coplanar with overlying sides 17e, 20e on each side of the center plane such that angle α is 90° between side 19m and first plane 40-40. Thus, side 19m intersects write gap side 17e at point P at the first plane.

The trailing shield further comprises a 10-19 kG magnetic layer 20b that contacts a top surface of trailing shield layer 20a, and adjoins the sides 20e and 17e of the trailing shield layer 20a and write gap 17b, respectively. Trailing shield layer 20b extends to far sides 60, 61 of the shield structure on each side of center plane 44-44. Since trailing shield layer 20b contacts a top (trailing) side 19a of the outer SS layer 19s on each side of the center plane, shield layers 20b and 19s are considered to be fully coupled at the first plane 40-40.

In other embodiments, angle α is between 30° and 90°. Accordingly, the intersection of side 19m and write gap side 17e at P on the first plane 40-40 is a greater distance from side 60 (or 61) than the intersection of side 19m and a second plane 41-41 at point R. The second plane is parallel to the first plane and includes a leading side (bottom surface) 19v of the inner hot seed layer 19h and a leading side 19b of the outer hSS layer 19s on each side of the center plane.

As explained later, the process to form the hybrid side shield and angle α is flexible so that a higher angle near 90 degrees may be employed to minimize far side ATE while a lower angle α optimizes TPI enhancement capability. Preferably, side 19m intersects plane 40-40 at a cross-track distance (½ b) of about 100 to 500 nm from the center plane 44-44 (FIG. 2a). Side gap width k may be reduced to about 30 nm or less to enable higher TPI.

Another important factor in determining side shield performance is thickness t of the hybrid side shield where t is from 100 to 200 nm and is the down-track distance between first plane 40-40 and second plane 41-41. The second plane coincides with a top (trailing) surface 16t of the leading shield 16 and also includes a bottom (lead) surface of lead gap 17a. In the exemplary embodiment, top surface 16t contacts leading sides 19b of the outer hSS layer 19s at the second plane. As a result, leading shield 16, outer hSS layers 19s, and trailing shield layer 20b form an AWA shield design around the write pole portion 14 of the main pole layer at the ABS. All shield layers and the main pole may be selected from one or more of CoFeN, CoFeNi, NiFe, and CoFe.

Figure 2C:
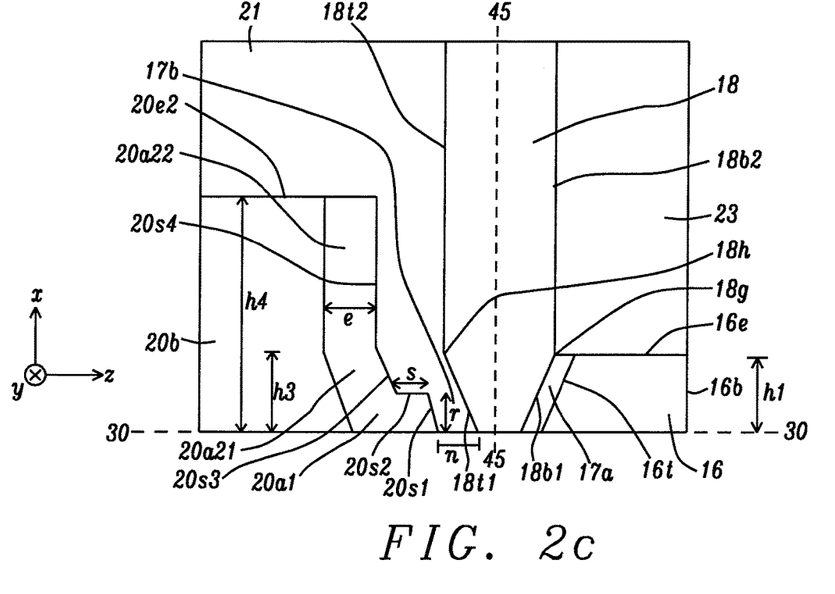
FIG. 2c is a down-track cross-sectional view of the main pole, leading shield, and trailing shield structure according to an embodiment of the present disclosure.

FIG. 2c depicts a down-track cross-sectional view of the AWA shield structure in FIG. 2b according to an embodiment of the present disclosure. Main pole 18 may have a tapered leading side 18b1 with a first end at the ABS 30-30 and a back end at corner 18g. A second leading side 18b2 adjoins a dielectric layer 23, and extends from corner 18g at first height (h1) toward a back end of the PMR writer. The second leading side is aligned parallel to plane 45-45 that is formed orthogonal to the ABS and which bisects the main pole. The main pole also has a tapered trailing side 18t1 between the ABS and corner 18h. A second trailing side 18t2 adjoins a dielectric layer 21, has a front end at corner 18h and extends toward a back end of the PMR writer, and parallel to plane 45-45. It should be understood that in alternative embodiments, one or both of the tapered leading side and the tapered trailing side on the main pole may be omitted such that side 18b2 and side 18t2, respectively, extend to the ABS.

In the exemplary embodiment, the leading shield 16 has a front side at the ABS 30-30, a top (trailing) side 16t adjoining the lead gap 17a, a back side 16e formed parallel to the ABS and with height h1 from the ABS, and a bottom (lead) side 16b. In other embodiments, the leading shield may be modified to extend a greater distance than h1 from the ABS such that a back portion thereof (not shown) has two sides aligned parallel to side 18b2.

According to one embodiment, the trailing shield hot seed layer may have first and second sections offset by down-track distances n and (n+s), respectively, from the main pole. The first section 20a1 of the trailing shield hot seed layer has a front side at the ABS 30-30, and a bottom side 20s1 facing tapered main pole side 18t1 and separated therefrom by a write gap thickness n. Bottom side extends a height r from the ABS and intersects with an end of side 20s2 that is parallel to the ABS. A second section of the trailing shield hot seed layer preferably has a uniform cross-track width e and comprises a first portion 20a21 and second portion 20a22 wherein the first portion adjoins side 20s2 at a cross-track distance (n+s) from main pole trailing side 18t1 and at height r. The first portion 20a21 has a bottom side 20s3 facing the main pole and aligned essentially parallel to trailing side 18t1. At height h3, bottom side 20s3 connects with a bottom side 20s4 of second portion 20a22 that extends to height h4 from the ABS. Bottom side 20s4 is formed parallel to main pole trailing side 18t2. The second section including portions 20a21 and 20a22 is moved farther from the main pole than first portion 20a1 in order to reduce magnetic coupling between the trailing shield hot seed layer and main pole 18.

Figure 2D:
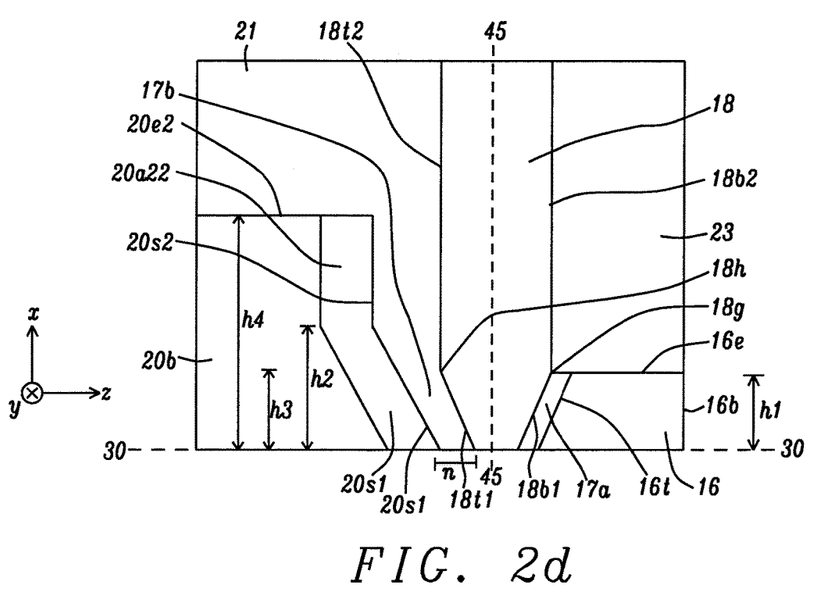
FIG. 2d is a down-track cross-sectional view of the main pole, leading shield, and trailing shield according to another embodiment of the present disclosure.

The present disclosure is not limited to the trailing shield structure depicted in FIG. 2c and may encompass other trailing shield designs such as the one illustrated in FIG. 2d. In this embodiment, the leading shield 16 in FIG. 2c is retained. However, the trailing shield hot seed layer is modified to have a first section 20a1 that extends from the ABS 30-30 to a second height h2 that is equal to or greater than h3 where h3 is the height of corner 18h from the ABS. First section 20a1 has a side facing the write pole and is aligned essentially parallel to tapered trailing side 18t1. A second section 20a2 of the trailing shield hot seed layer extends from an end of first section 20a1 to height h4 and terminates at back end 20e2. The second section has side 20s2 aligned substantially parallel to main pole trailing side 18t2. Again, the write gap 17b is non-conformal in that there is a greater write gap thickness between trailing shield side 20s2 and main pole side 18t2 than between trailing shield side 20s1 and main pole side 18t1.

Figure 9:
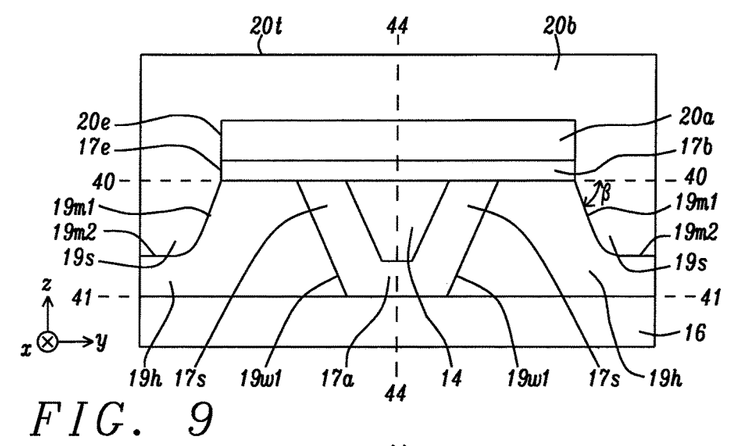

The present disclosure also anticipates an alternative embodiment shown in FIG. 9 where each side shield has a non-linear boundary between hot seed (inner hSS) layer 19h and outer hSS layer 19s. In other words, all features are retained from the AWA shield structure in FIG. 2b except linear side 19m is replaced by a side with two sections, and the side does not contact trailing shield 16 at plane 41-41 as in the first embodiment. An upper first section 19m1 of the non-linear side intersects a write gap side 17e at plane 40-40 on each side of center plane 44-44 and forms an angle β less than 90° with plane 40-40. Meanwhile, a lower second section 19m2 connects with an end of section 19m1 and extends to a side of the side shield structure. The second section is substantially parallel to plane 41-41. As explained in a later section, the non-linear sidewall between hSS layers 19h and 19s results from a less aggressive milling during the fabrication thereof.

Figure 12:
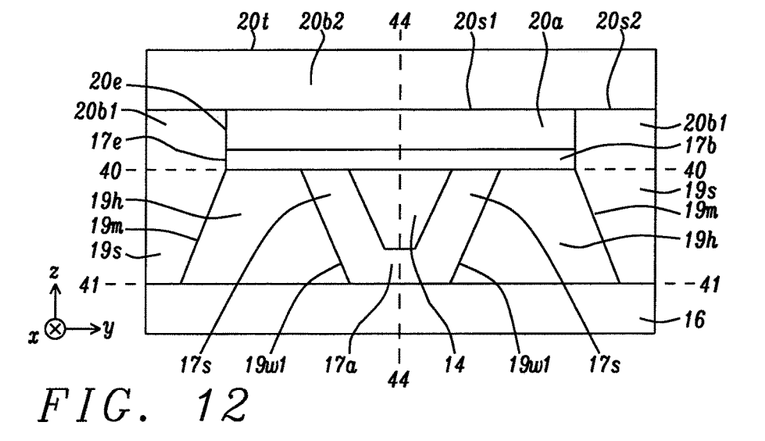
FIG. 12 is an ABS view showing a method of depositing a trailing shield having a different composition from that of an outer portion of side shield according to another embodiment of the present disclosure.

In yet another embodiment depicted in FIG. 12 that represents a modification of the AWA shield structure shown in FIG. 2b, there is a single linear side 19m between inner hSS layer 19h and outer hSS layer 19s. However, angle α between side 19m and plane 40-40 is less than 90°. Furthermore, a stack that features two different TS layers replaces trailing shield layer 20b. There is a lower TS layer 20b1 between sides 17e, 20e of the write gap and hot seed layer 20a, respectively, and a far side 60 or 61 of the shield structure. TS layer 20b1 is made of the same magnetic material as in outer hSS layer 19s, and has a top surface 20s2 that is coplanar with a top surface 20s1 of hot seed layer 20a. TS layer 20b2 has a full cross-track width between shield structure sides 60, 61, and contacts hot seed layer top surface 20s1 TS layer 20b1, and the top surface 20s2 on each side of the center plane 44-44. This embodiment enables a higher Ms material above hot seed layer 20a to maintain a high magnetic flux driving force through the trailing shield structure while allowing for a lower Ms material at the sides of the hot seed layer to maintain low ATE.

The present disclosure also encompasses various methods of forming an AWA shield structure having a hSS design described previously. All method embodiments include process steps shown in FIGS. 3-7 but diverge thereafter.

Figure 3:
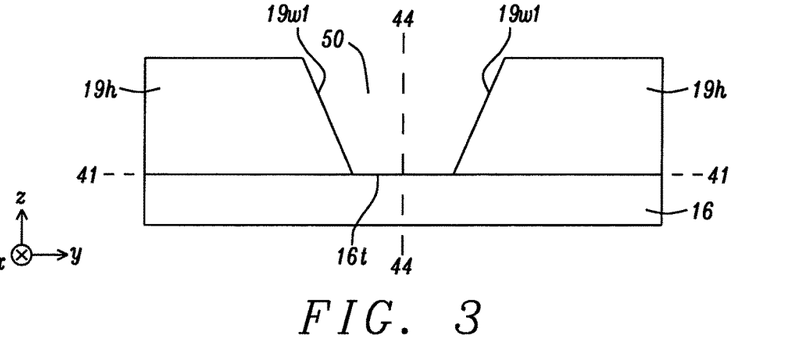
FIGS. 3-9 are ABS views showing a sequence of steps for forming an AWA shield structure according to an embodiment of the present disclosure.

Referring to FIG. 3, a side shield hot seed layer 19h is deposited on a leading shield layer 16. Then an opening 50 corresponding to the desired shape and size of the main pole and gap layers is formed in hot seed layer 19h by a conventional photolithography patterning and etching sequence. The opening has sides 19w1, and exposes top surface 16t of the leading shield at plane 41-41 that is orthogonal to center plane 44-44. In embodiments wherein the main pole 18 has a tapered leading side 18b1 as in FIG. 2c, a taper is formed on top surface 16t at this point by a well known ion beam etching (IBE) process before subsequent layers are deposited.

Figure 4:
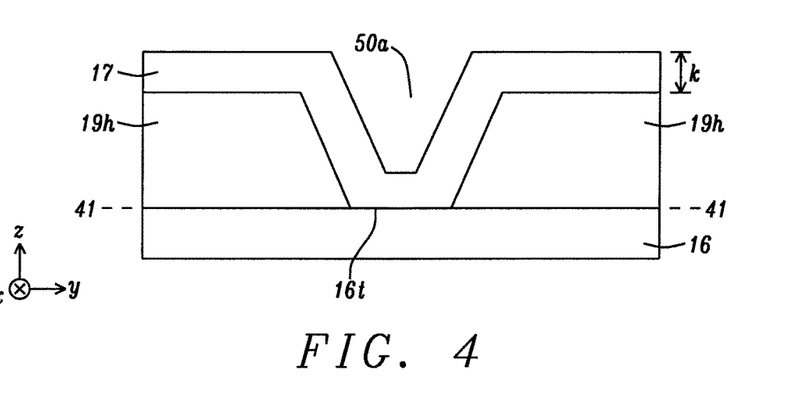

In FIG. 4, a gap layer 17 is conformally deposited by a plasma enhanced chemical vapor deposition (PECVD) method or the like to a thickness k on the sides 19w1 and top surface 16t to partially fill the opening and form a smaller opening 50a. The gap layer may be comprised of one or more dielectric materials including alumina and other metal oxides, nitrides, or oxynitrides.

Figure 5:
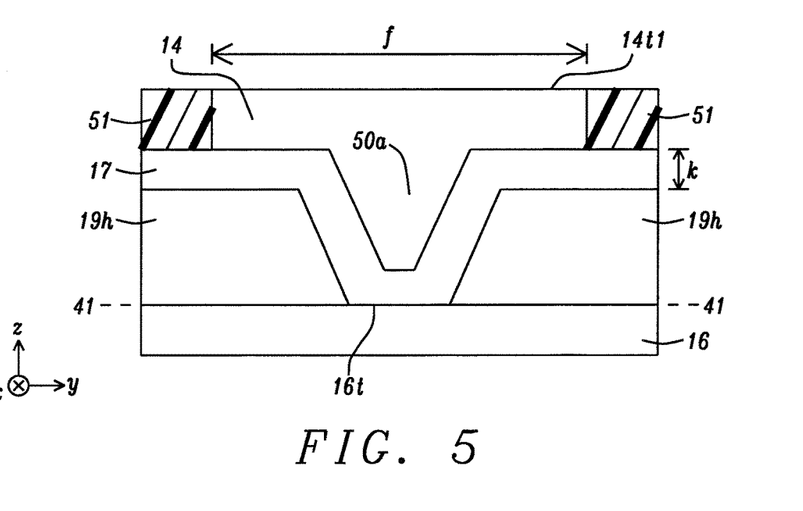

Referring to FIG. 5, a photoresist layer 51 is patterned to form an opening therein (not shown) having cross-track width f that exposes all of opening 50a. Thereafter, a main pole layer including write pole 14 with top surface 14t1 is deposited to fill opening 50a and the opening in the photoresist layer. A metal seed layer (not shown) such as Ru may be deposited on the gap layer 17 prior to plating the main pole layer.

Figure 6:
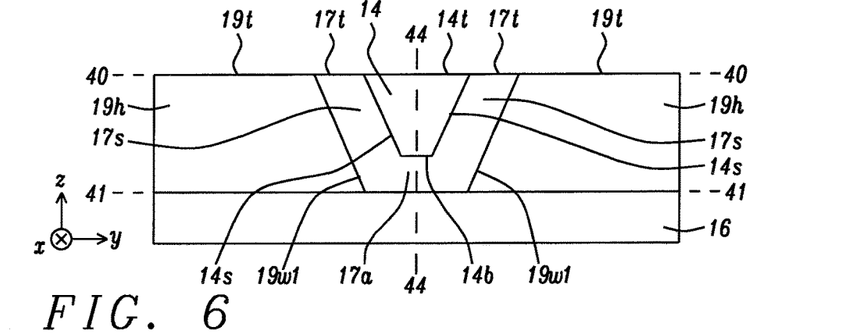

With regard to FIG. 6, a CMP process is performed to remove all material above plane 40-40 and thereby establish top surfaces 19t on hot seed layer 19h, trailing edge 14t on the write pole 14, and top surfaces 17t on side gaps 17s at plane 40-40. Write pole sides 14s are equidistant from center plane 44-44. At this point, the gap layer 17 is considered to comprise side gaps 17s and lead gap 17a. In embodiments in which the main pole has a tapered trailing side, an IBE is employed following the CMP process to from the tapered trailing side 18t1 (FIG. 2c) with one end at write pole trailing edge 14t.

Figure 7:
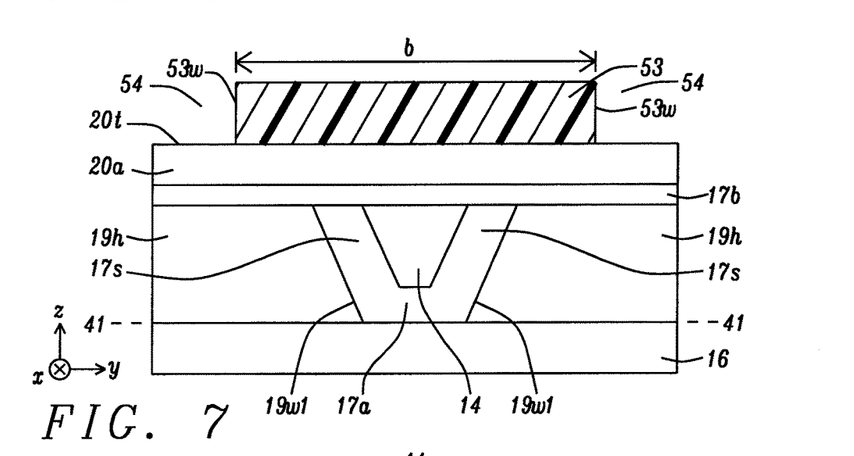

Referring to FIG. 7, the write gap 17b and trailing shield layer 20a are sequentially deposited. Next, a second photoresist layer is coated and patterned on trailing shield layer 20a to provide a photoresist island 53 having sidewalls 53w thereby forming opening 54 above portions of the trailing shield layer top surface 20t to be removed in a subsequent step. There is a plurality of islands 53 formed during the photoresist patterning process wherein an island is formed over each of a plurality of write head structures on a substrate (slider) that is not shown. However, only one island and one partially formed PMR write head are depicted in order to simplify the drawing. Each photoresist island has a cross-track width b corresponding to the desired write gap width in the final device.

Figure 8:
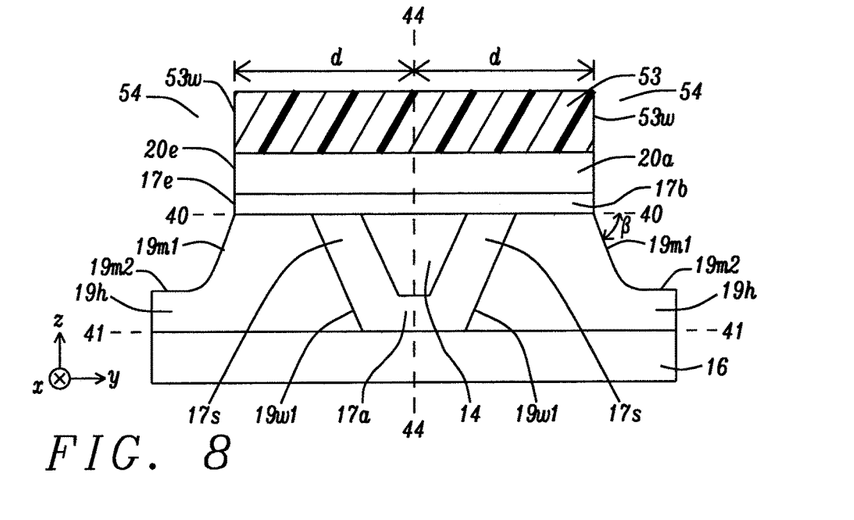

In FIG. 8, according to one embodiment of the present disclosure, an IBE process is performed to transfer opening 54 through exposed regions of trailing shield layer 20a, write gap 17b, and a portion of side shield hot seed layer 19h. Note the IBE process may comprise first and second etch steps with different conditions to remove exposed regions of TS layer 20a, and write gap 17b, respectively. Then a third etch step with moderate conditions as appreciated by those skilled in the art is employed to remove portions of hot seed layer 19h. In this case a non-linear sidewall is formed on hot seed layer 19h wherein a first upper section 19m1 is formed at angle β of <90° with respect to plane 40-40, and a lower second section 19m2 connects with an end of section 19m1 and extends to a side 60 (or 61) of the side shield structure. Section 19m2 may be substantially parallel to plane 41-41 as indicated in the exemplary embodiment.

In FIG. 9, the shield structure in FIG. 8 is shown after photoresist layer 53 is stripped, and then outer hSS layer 19s and trailing shield layer 20b are deposited to fill openings 54. A chemical mechanical polish (CMP) process is performed to yield a planar top surface 20t on TS layer 20b. In this embodiment, outer hSS layer 19s and TS layer 20b are comprised of the same magnetic material and thereby form a seamless transition at plane 40-40 that marks the interface between a top surface of outer hSS layer 19s and bottom surface of TS layer 20b.

Figure 10:
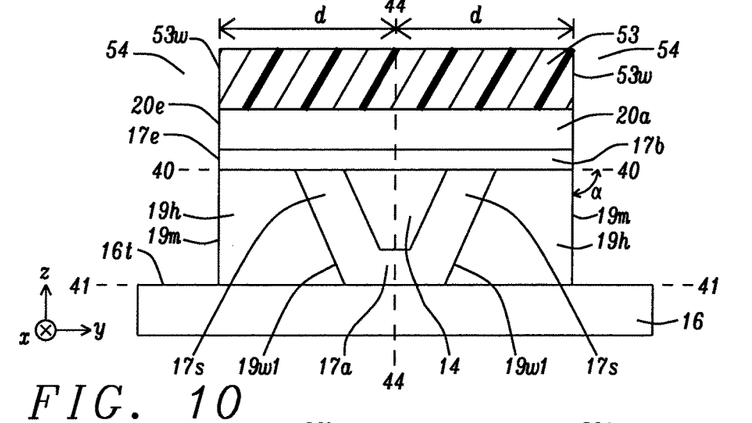
FIGS. 10-11 show ABS views of a sequence of steps for etching a side shield and then depositing a trailing shield having the same composition as an outer portion of the side shield according to an embodiment of the present disclosure.

Referring to FIG. 10, a second process embodiment is depicted and shows the partially formed shield structure in FIG. 7 after an IBE process is performed to remove exposed regions of hot seed layer 20a, write gap 17b, and hot seed layer 19h below opening 54. Again, the IBE process may comprise one or more steps but in this case stops at plane 41-41 on a top surface 16t of leading shield 16. In one embodiment where side 19m is substantially coplanar with sides 17e and 20e, the IBE may be a single step where ions (not shown) are directed essentially perpendicular to plane 41-41. In other embodiments, two etch steps may be employed wherein a first step comprises a substantially vertical etch through layers 20a, 17b, and then an angled etch through hot seed layer 19h thereby establishing an angle α for side 19m where α is ≥30 degrees but less than 90 degrees with respect to plane 40-40. Each side 19m at plane 40-40 is preferably formed a distance d (½ b) of 100 to 500 nm from center plane 44-44. Although angle α is shown as 90 degrees, this embodiment also anticipates α may be <90°.

Figure 11:
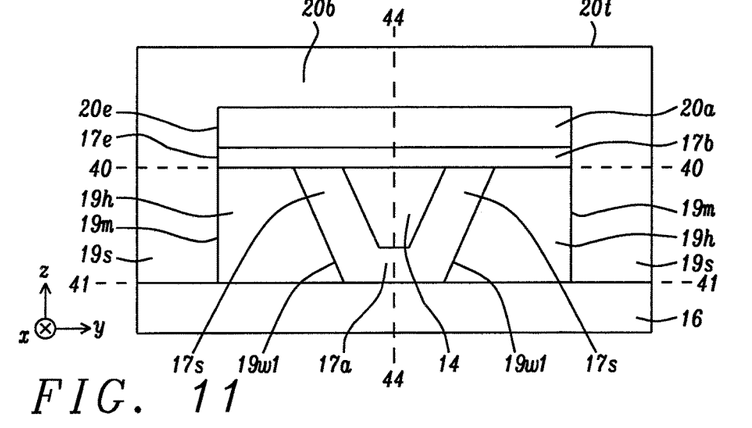

Referring to FIG. 11, the photoresist layer 53 is removed by a well known stripping process. Thereafter, outer hSS layer 19s and trailing shield layer 20b are plated by a conventional method. In one embodiment wherein both layers 19s and 20b are made of the same 10-19 kG material, only one plating step is employed. A CMP process is used to provide a planar top surface 20t on TS layer 20b.

In an alternative embodiment, side 19m in FIG. 10 may be non-vertical such that angle α is <90°. As illustrated in FIG. 12, the present disclosure also encompasses a process flow that continues from FIG. 10 and includes two different plating steps to form the outer hSS layer 19s and the trailing shield structure. During a first plating step, outer hSS layer 19s and trailing shield layer 20b1 are deposited. There is a seamless transition between the two layers at plane 40-40 to mark the interface between the top surface of hSS layer 19s and bottom surface of TS layer 20b1. Then a first CMP process is employed to form a top surface 20s2 on TS layer 20b1 that is coplanar with hot seed layer top surface 20s1. In the following step, TS layer 20b2 is plated on hot seed layer 20a and TS layer 20b1. A second CMP process is used to form a planar top surface 20t on TS layer 20b2. As explained previously, the process flow of this embodiment enables outer hSS layer 19s and TS layer 20b1 to have a different Ms value (preferably lower) and different magnetic composition than the trailing shield layer 20b2. Thus, a high area density capability (ADC) is achieved while maintaining low ATE.

Conventional processes are then used to fabricate overlying layers in the PMR write head as appreciated by those skilled in the art. After all layers are formed in the PMR write head, a lapping process is typically performed to generate an ABS (not shown) that is orthogonal to the center plane 44-44 and to plane 40-40.

To demonstrate the advantages of the present disclosure, a finite element method (FEM) simulation was performed wherein a conventional writer as shown in FIGS. 2a-2c with gap width k=35 nm, c=62 nm, inner hSS layer height m1=125 nm, t=120 nm, write gap thickness n=22 nm, write gap width b=360 nm, $\alpha$=90 degrees, and a track width TW of 45 nm was compared with a PMR writer having a shield design shown in FIG. 1 where gap width g1=35 nm, side shield thickness v1=120 nm, write gap width w=360 nm, TW=45 nm, and write gap thickness v2=22 nm. The trailing shield hot seed layer 20a, and inner hSS layers 19h involved in the study are made of a 24 kG material while trailing shield layer 20b, leading shield 16, outer hSS layers 19s, and side shield layers 19 (FIG. 1) are comprised of 12 kG material in this simulation.

Figure 13A:
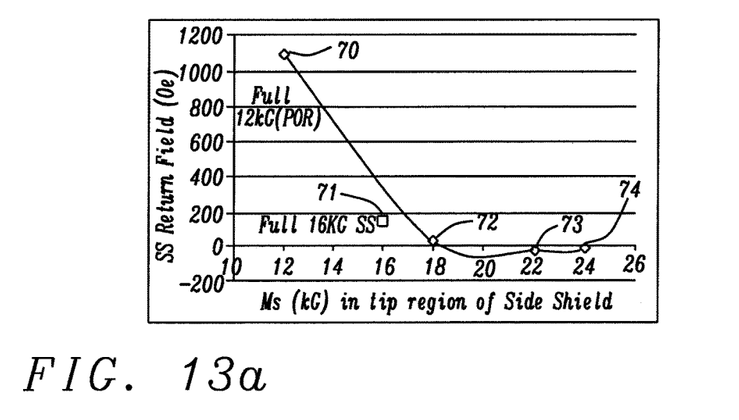
FIG. 13a is a plot showing side shield return field and FIG. 13b is a plot showing trailing shield return field for different side shield structures including a hSS design formed according to an embodiment of the present disclosure.
Figure 13B:
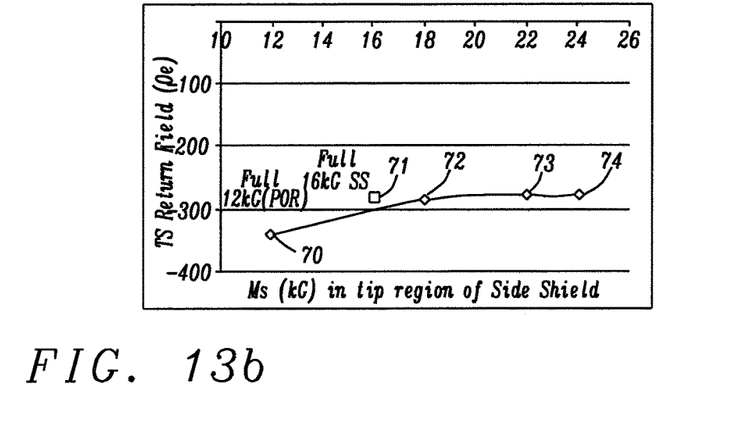
Figure 13C:
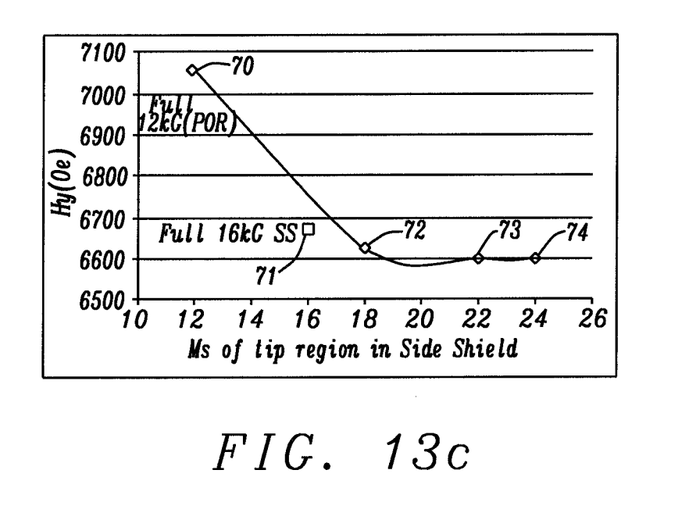
FIG. 13c is a plot showing magnetic field strength (Hy) and FIG. 13d is a plot showing erase width during AC mode (EWAC) for different side shield structures including a hSS design according to an embodiment of the present disclosure.
Figure 13D:
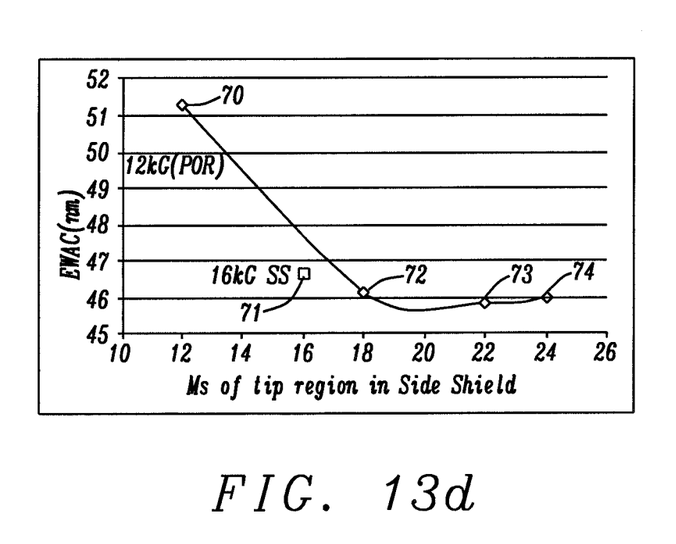

In FIG. 13a-13d, simulated results are shown for a PMR writer with various side shield designs including the process of record (POR) in FIG. 1 where the entire side shield is made of 12 kG material (70), a reference 71 in which the entire side shield is a 16 kG layer, and points 72, 73, 74 each representing a hybrid SS according to an embodiment of the present disclosure wherein the inner hSS layer is comprised of 18 kG, 22 kG, or 24 kG material, respectively, and the outer hSS layer is a 12 kG layer. As shown in FIG. 13a, points 72-74 show a reduction of about 1000 Oe in side shield return field compared with point 70. A negative Oe value for points 72-74 means a better cross-track field gradient. When coupled with the trailing shield return field in FIG. 13b where all points have substantially similar Oe values indicating a stable down-track field gradient, the net outcome is that the hSS designs (points 72-74) enable higher area density capability (ADC) and TPI. FIG. 13c shows a loss in Hy field by replacing the POR design with a hSS of the present disclosure is only about 500 Oe. FIG. 13d illustrates that erase width during AC mode (EWAC) is also improved with a hSS design (points 72-74).

Figure 14A:
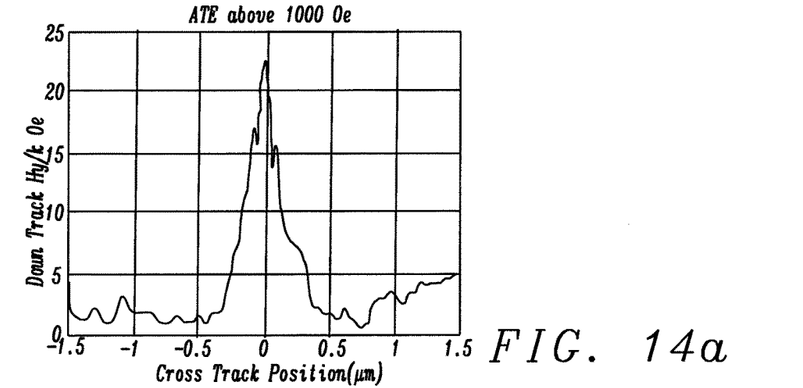
FIG. 14a-14h are simulated plots illustrating ATI under different applied fields for different side shield structures including hSS designs formed according to an embodiment of the present disclosure.
Figure 14B:
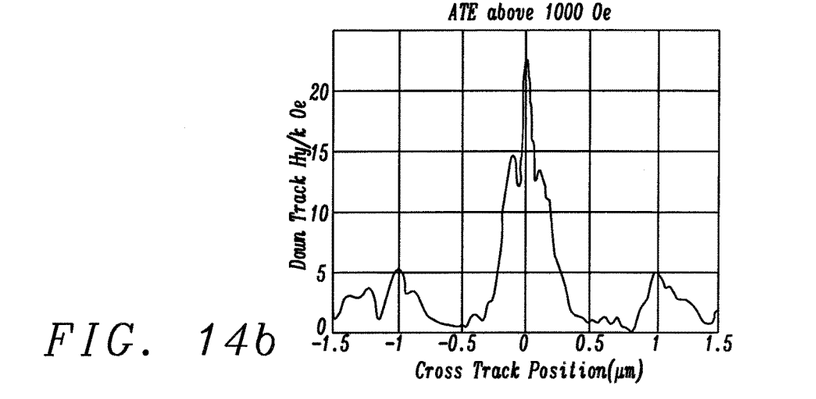
Figure 14C:
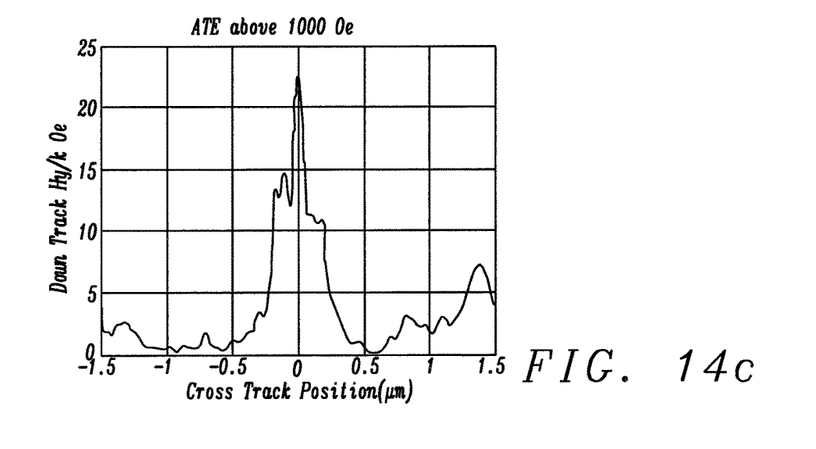

TPI mapping shows that a hybrid side shield corresponding to 12 kG outer layer, 18 kG inner layer (FIG. 14b) and to a 12 kG outer layer, 22 kG inner layer (FIG. 14c) formed according to an embodiment of the present disclosure exhibits better ATI than a side shield made entirely of 18 kG magnetic material (FIG. 14d), especially at a 1000 Oe threshold. FIG. 14a depicts TPI mapping for a side shield make entirely of 12 kG magnetic material with a 1000 Oe threshold. TPI mapping is also illustrated for a 1500 Oe threshold in FIG. 14e (12 kG full side shield), FIG. 14f (12 kG outer SS, 18 kG inner SS), FIG. 14g (12 kG outer SS, 22 kG inner SS), and FIG. 14h (18 kG full side shield).

Figure 14D:
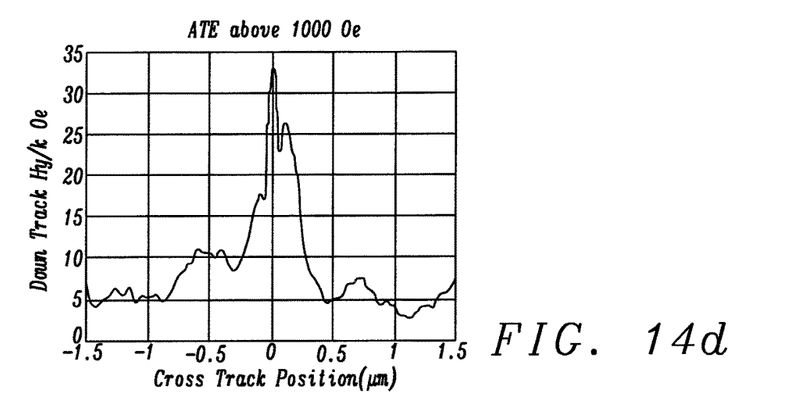
Figure 14E:
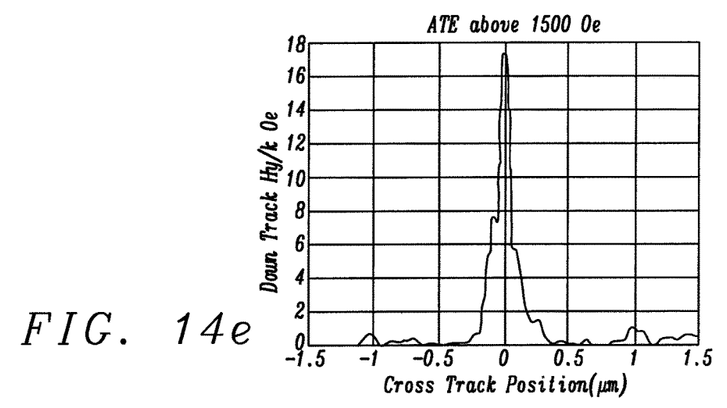
Figure 14F:
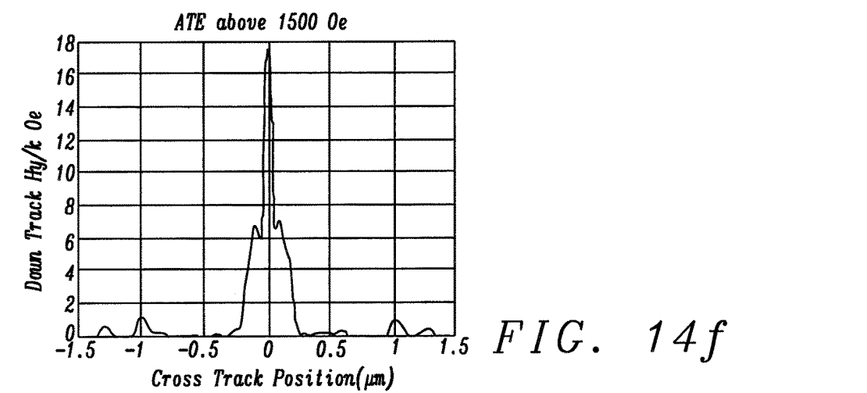
Figure 14G:
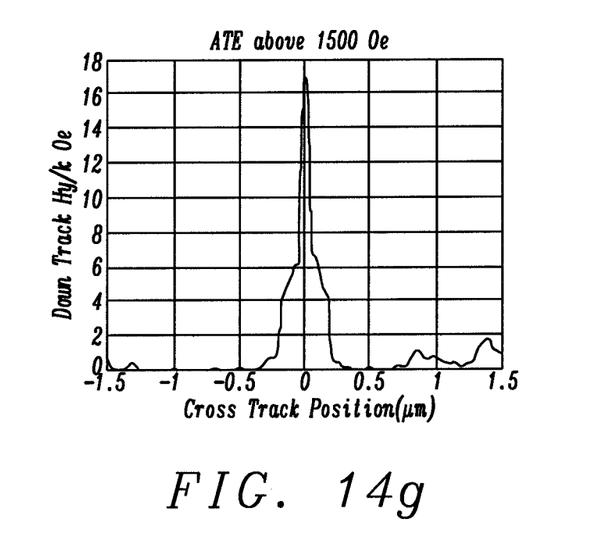
Figure 14H:
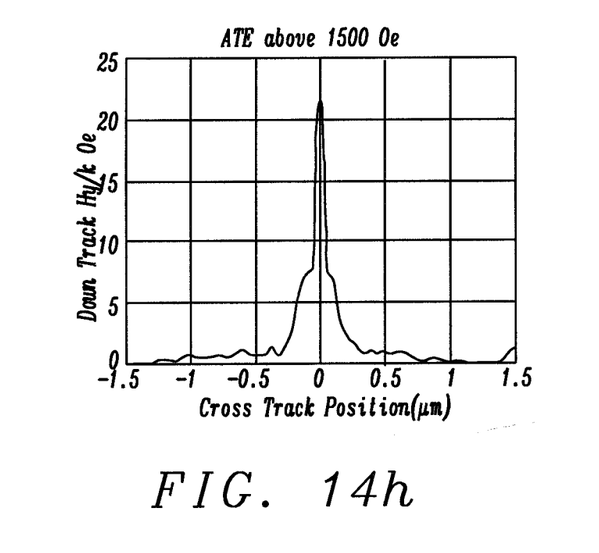

Although a hybrid side shield in FIGS. 14b, 14c, 14f, 14g has a slightly wider nearby ATI distribution than a full side shield made of a 12 kG material in FIG. 14a, 14e, or a full 18 kG side shield in FIGS. 14d, 14h, the far side ATI is cleaner (lower magnitude) in the hybrid side shield designs. ATI is improved for full 12 kG SS (or full 18 kG SS), and hybrid side shields after increasing the threshold value from 1000 Oe to 1500 Oe. For example, FIG. 14g has a narrower nearby ATI distribution and a cleaner far side ATI than FIG. 14c for the hybrid side shield wherein the inner hSS layer is 22 kG while the outer hSS layer is a 12 kG material according to an embodiment described herein. By increasing the threshold value to 2000 Oe (not shown), the nearby ATI distribution is further narrowed for all samples and far side ATI is somewhat reduced. Results (not shown) for a hSS design comprising an inner 24 kG layer and an outer 12 kG layer indicate slightly lower far side ATI than FIG. 11c at a 1000 Oe threshold. However, the nearby ATI distribution becomes somewhat larger compared with FIG. 14c.

The AWA shield structure and hSS design described herein has flexibility in that the down-track thickness of the hSS, and cross-track width of the inner hSS layer may be easily modified to adjust TPI and ATI. Moreover, conventional materials and fewer process steps are employed in the fabrication of the hSS designs disclosed herein resulting in significant cost savings.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
   (a) a main pole with a leading edge at an air bearing surface (ABS), and a trailing edge at the ABS and formed at a first plane that is orthogonal to the ABS and to a center plane formed equidistant between two main pole sides that connect the leading edge and the trailing edge;
   (b) a gap layer surrounding the main pole at the ABS and comprising a write gap that contacts the trailing edge and has a first cross-track width between a first side and a second side at the first plane, a side gap layer adjoining each of the main pole sides, and a lead gap contacting the leading edge at a second plane that is parallel to the first plane; and
   (c) a hybrid side shield (hSS), comprising;
      (1) an inner hSS layer with a first magnetization saturation (Ms) value on each side of the center plane with a first side thereof adjoining the side gap layer, a second side at the first plane, a third side opposite the first side and wherein the third side is aligned at an angle $\alpha$ to the first plane and intersects one of the write gap sides at the first plane, and a fourth side at the second plane that is a first down-track distance from the first plane; and
      (2) an outer hSS layer with a second Ms value less than the first Ms value on each side of the center plane and having a first side contacting the third side of the inner hSS layer between the first and second planes, a second side at the first plane, a third side at the second plane, and a fourth side at a far side of the hybrid side shield wherein the far side is parallel to the center plane.

2. The PMR writer of claim 1 wherein the angle $\alpha$ is 90° such that the third side of the inner hSS layer is coplanar with one of the sides of the write gap on each side of the center plane.

3. The PMR writer of claim 1 wherein the angle $\alpha$ is from 30 to less than 90° such that the intersection of the third and fourth sides of the inner hSS layer at the second plane is a lesser distance from one of the far sides than the intersection of the second and third sides of the inner hSS layer at the first plane.

4. The PMR writer of claim 1 wherein the intersection the third side of the inner hSS layer with one of the write gap sides at the first plane is about 100 to 500 nm from the center plane.

5. The PMR writer of claim 1 wherein the first and third sides of the inner hSS layer extend a first height (m1) from the ABS, and the fourth side of the outer hSS layer extends a second height (m2) from the ABS where m2>m1.

6. The PMR writer of claim 5 wherein m1 is about 120 to 200 nm.

7. The PMR writer of claim 1 wherein the first down-track thickness is about 100 to 200 nm.

8. The PMR writer of claim 1 further comprising a trailing shield structure including a hot seed (19-24 kG) layer on the write gap and having the first cross-track width between two sides each being coplanar with a write gap side, and a trailing shield (TS) layer formed on a top surface and sides of the hot seed layer, the TS layer also fully contacts the second side of the outer hSS layer at the first plane on each side of the center plane.

9. The PMR writer of claim 1 further comprising a trailing shield structure that comprises:
(a) a hot seed (19-24 kG) layer on the write gap and having the first cross-track width between two sides that are each coplanar with a write gap side;
(b) a first trailing shield (TS) layer with the second Ms value formed at the sides of hot seed layer and write gap, and fully contacting the second side of the outer hSS layer at the first plane on each side of the center plane, the first TS layer has a top surface that is coplanar with a top surface of the write gap; and
(c) a second trailing shield layer with a Ms value greater than the second Ms value, and fully contacting the top surfaces of the first TS layer and hot seed layer.

10. A perpendicular magnetic recording (PMR) writer, comprising:
(a) a main pole with a leading edge at an air bearing surface (ABS), and a trailing edge at the ABS and formed at a first plane that is orthogonal to the ABS and to a center plane formed equidistant between two main pole sides that connect the leading edge and the trailing edge;
(b) a gap layer surrounding the main pole at the ABS and comprising a write gap that contacts the trailing edge and has a first cross-track width between a first side and a second side at the first plane, a side gap layer adjoining each of the main pole sides, and a lead gap contacting the leading edge;
(c) a hybrid side shield (hSS), comprising;
(1) an inner hSS layer with a first magnetization saturation (Ms) value on each side of the center plane with a first side thereof adjoining the side gap layer, a second side at the first plane, a third side opposite the first side and wherein at least an upper portion of the third side is aligned at an angle β to the first plane and intersects one of the write gap sides at the first plane, and a fourth side at a second plane that is parallel to the first plane and includes a top surface of a leading shield; and
(2) an outer hSS layer with a second Ms value less than the first Ms value on each side of the center plane and having a first side contacting the third side of the inner hSS layer, a second side at the first plane, and a third side at a far side of the hybrid side shield wherein the far side is parallel to the center plane;
(d) a composite trailing shield, comprising:
(1) a 19-24 kG (hot seed) layer having the first cross-track width and adjoining a top surface of the write gap; and
(2) a 10-19 kG magnetic layer that adjoins one of the sides of the write gap and a side of the hot seed layer on each side of the center plane, and is formed on a top surface of the hot seed layer, the 10-19 kG magnetic layer is fully coupled to the outer hSS layer at the first plane; and
(e) the leading shield wherein the top surface thereof contacts the lead gap at the center plane.

11. The PMR writer of claim 10 wherein the angle β is <90°.

12. The PMR writer of claim 11 wherein the third side further comprises a bottom portion formed substantially parallel to the first plane, and having a first end that connects to an end of the upper portion, and a second end at one of the far sides of the hybrid side shield.

13. The PMR writer of claim 10 wherein the intersection the third side of the inner hSS layer with one of the write gap sides at the first plane is about 100 to 500 nm from the center plane.

14. The PMR writer of claim 10 wherein the first and third sides of the inner hSS layer extend a first height (m1) from the ABS, and the third side of the outer hSS layer extends a second height (m2) from the ABS where m2>m1.

15. The PMR writer of claim 10 wherein the first Ms value is about 15 kG to 24 kG.

16. The PMR writer of claim 14 wherein the first side of the inner hSS layer is a second cross-track width from a nearest main pole side at the ABS and is formed substantially parallel thereto in a region proximate to the ABS.

17. The PMR writer of claim 15 wherein the first height is greater than or equal to a throat height of the nearest main pole side.

18. The PMR writer of claim 10 wherein the first plane is a down-track thickness of about 100 to 200 nm from the second plane.

19. A method of forming a perpendicular magnetic recording (PMR) writer, comprising:
(a) depositing a 15-24 kG magnetic layer on a leading shield, and forming an opening with sides in the 15-24 kG magnetic layer that exposes a top surface of the leading shield;
(b) depositing a gap layer with a first thickness on the leading shield top surface and on the sides of the opening to partially fill the opening;
(c) depositing a main pole layer on the gap layer to fill the opening;
(d) performing a chemical mechanical polish (CMP) process to form a first plane that includes a top surface of the main pole layer, and top surfaces of the 15-24 kG magnetic layer on either side of a center plane that bisects the main pole layer and is orthogonal to the first plane;
(e) sequentially depositing a write gap and a 19-24 kG trailing shield layer on the top surfaces of the main pole layer and the 15-24 kG magnetic layer;
(f) performing an etching process to form a sidewall on the 19-24 kG trailing shield layer and on the write gap that intersects the first plane at a first cross-track width from the center plane, and then removing portions of the 15-24 kG magnetic layer to form a side thereon that intersects the sidewall at the first-cross-track distance and forms an angle with the first plane; and
(g) depositing a 10-19 kG layer on the 19-24 kG layer and on the side of the 15-24 kG magnetic layer such that a portion of the 10-19 kG layer below the first plane forms an outer side shield layer, the 15-24 kG magnetic layer forms an inner side shield layer, and a portion of the 10-19 kG layer above the first plane becomes a second trailing shield layer, the inner side shield layer has a magnetization saturation (Ms) value greater than that of the outer side shield layer.

20. The method of claim 19 wherein the angle is >30° and ≤90°, the side of the 15-24 kG magnetic layer is linear and contacts the leading shield top surface at a second plane that is parallel to the first plane.

21. The method of claim 19 wherein the angle is <90°, the side of the 15-24 kG magnetic layer is non-linear such that an upper portion thereof forms the angle with the first plane, and a lower portion has one end contacting a end of the upper portion and a second end at a far side of the side shield, the lower portion is aligned substantially parallel to the first plane.

22. The method of claim 20 wherein a down-track distance between the first and second planes is about 100 to 200 nm.

23. The method of claim 19 further comprised of forming a taper on the top surface of the leading shield before depositing the gap layer.

24. The method of claim 19 further comprised of forming a taper on the top surface of the main pole layer before depositing the write gap.

25. The method of claim 19 further comprised of forming an air bearing surface (ABS) on the PMR writer after depositing the 10-19 kG layer, the ABS is orthogonal to the first plane and to the center plane, the inner side shield layer has a back side that is substantially parallel to the ABS at a first height (m1), and the outer side shield layer has a back side that extends from the first height to a second height (m2) at a far side of the outer side shield where m2>m1.

26. The method of claim 25 wherein the inner side shield layer has a side formed substantially parallel to a nearest main pole side between the ABS and the back side of the inner side shield layer.

27. The method of claim 25 wherein m1 is about 120 to 200 nm.

28. The method of claim 19 further comprising:
   (a) performing a first chemical mechanical polish (CMP) process to form a top surface on the second trailing shield layer that is coplanar with a top surface of the 19-24 kG trailing shield layer;
   (b) depositing a third trailing shield layer on the top surfaces of the 19-24 kG trailing shield layer and second trailing shield layer, the third trailing shield layer has a higher Ms value than that of the second trailing shield layer; and
   (c) performing a second CMP process to form a planar top surface on the third trailing shield layer.

* * * * *